(No Model.) 2 Sheets—Sheet 2.
C. BLAKELY.
DRILL.
No. 554,209. Patented Feb. 4, 1896.
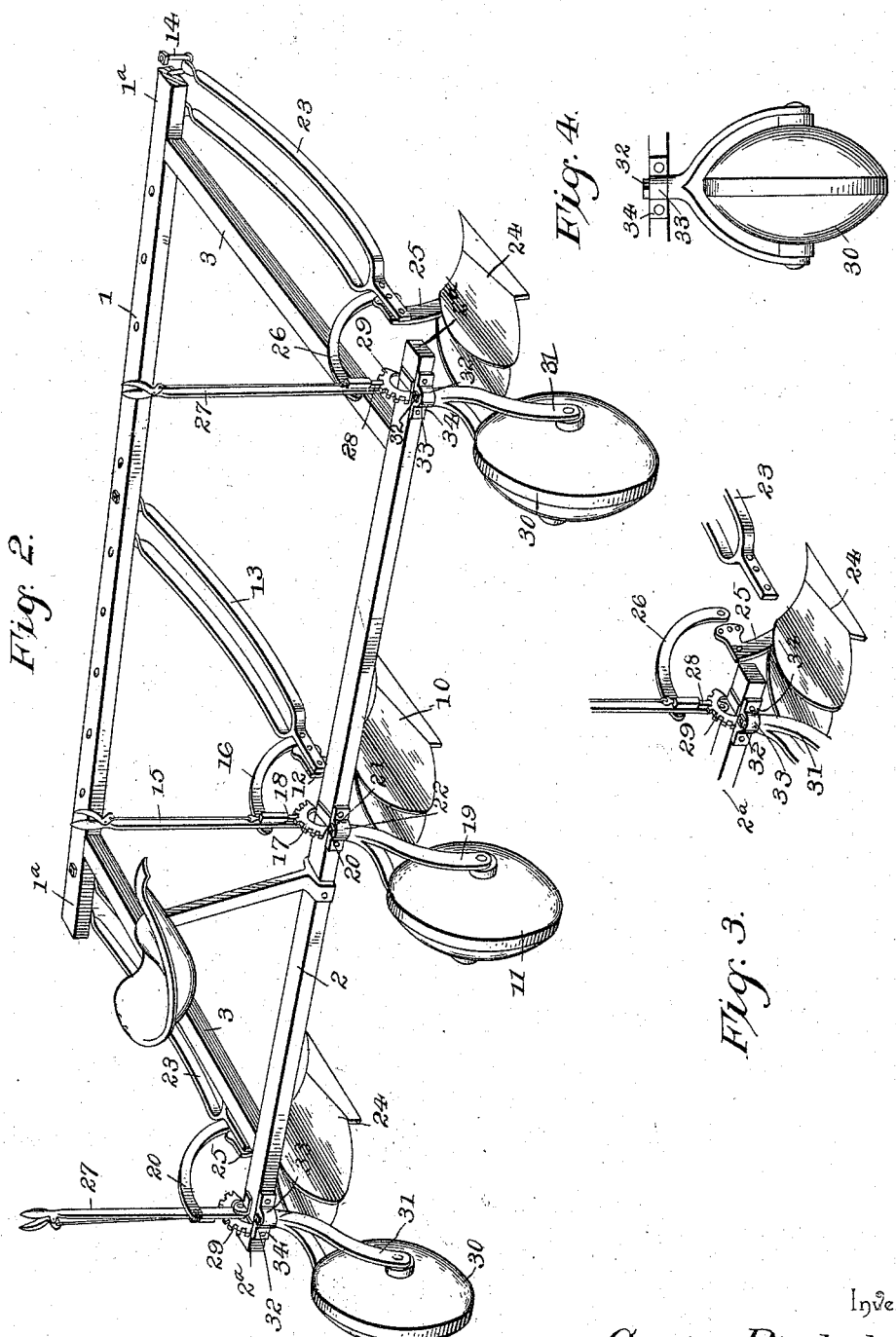
Witnesses
Chas. A. Ford.
Inventor
Collins Blakely,
By his Attorneys.

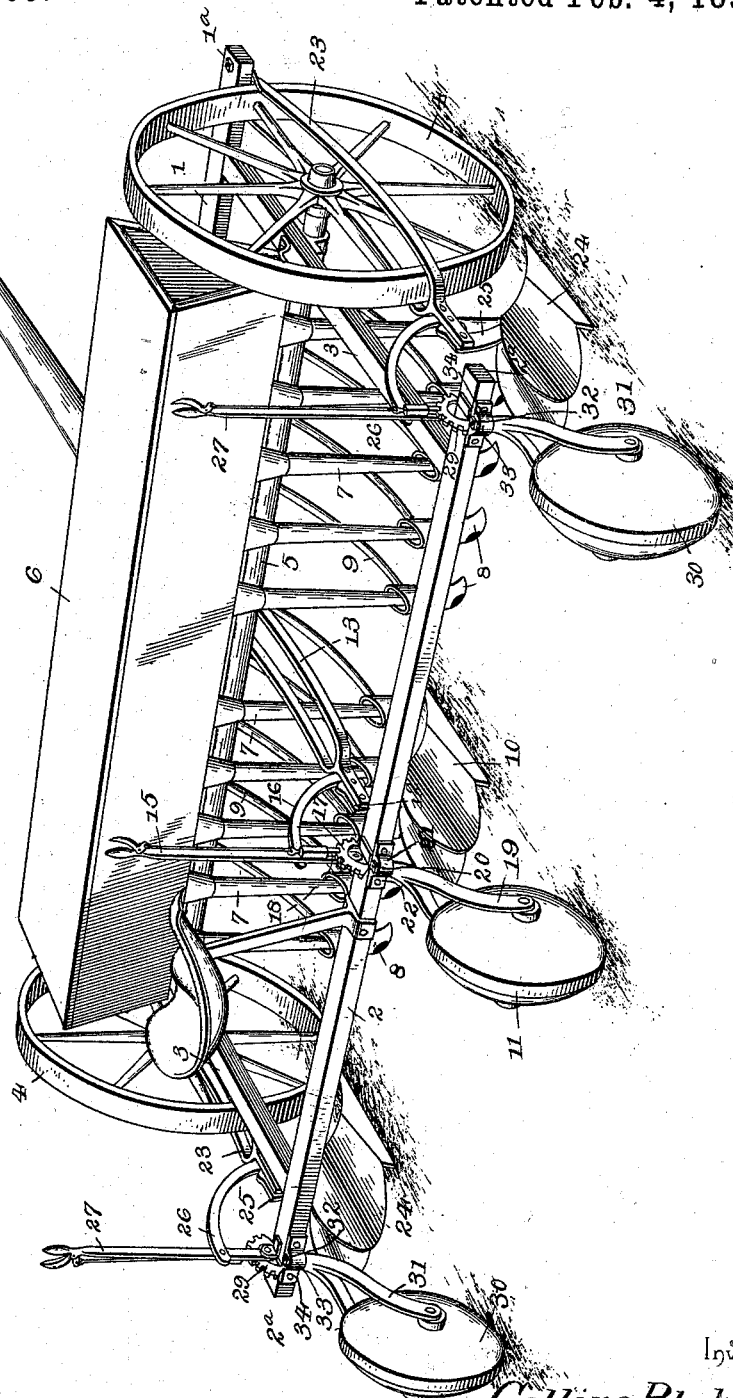

UNITED STATES PATENT OFFICE.

COLLINS BLAKELY, OF ELSINORE, UTAH.

DRILL.

SPECIFICATION forming part of Letters Patent No. 554,209, dated February 4, 1896.

Application filed January 12, 1895. Serial No. 534,692. (No model.)

*To all whom it may concern:*

Be it known that I, COLLINS BLAKELY, a citizen of the United States, residing at Elsinore, in the county of Sevier, Utah Territory, have invented a new and useful Drill, of which the following is a specification.

My invention relates to planters of the class in which the seed is planted in drills, and particularly to an attachment for such planters whereby irrigating-furrows are formed between the rows of seed-drills, whereby the irrigation of a planted field is simplified and the water is received by said irrigating-furrows in position to be beneficial without injury to the seed-furrows.

Further objects and advantages of the invention will appear in the following description, and the novel features thereof will be particularly pointed out in the appended claims.

In the drawings, Figure 1 is a perspective view of an attachment embodying my invention applied in operative position to a drilling-planter. Fig. 2 is a detail view, in perspective, of the attachment. Fig. 3 is a similar view of one of the furrow-opening shovels with its attachments. Fig. 4 is a detail view of one of the rollers.

Similar numerals of reference indicate corresponding parts in all the figures of the drawings.

The frame comprises a front transverse beam, 1, and a rear transverse beam, 2, connected by the longitudinal side beams, 3, which are set in from the extremities of the front and rear beams to form projecting terminals 1ª and 2ª. The ground-wheels 4 are carried by the transverse shaft 5, which is mounted in bearings secured to the lower sides of the beams 3, and the seed-box 6, which is arranged transversely on the frame, is provided with depending seed-chutes 7, terminating at their lower extremities in drill-shoes 8, spaced apart in transverse series and supported by means of braces or drag-bars 9, which are attached at their front extremities to the front beam, 1. The mechanism for agitating the seed in the seed-boxes and causing it to be discharged through the seed-chutes forms no part of my invention and may be of any preferred or well-known construction.

A series of drill-shoes 8 is arranged upon each side of the longitudinal center of the machine, thus forming a space between the inner or adjacent ends of the series, and arranged upon the longitudinal center of the machine between said inner ends of the series of drill-shoes is a double-furrow-opening shovel 10, followed by a roller 11 having a V-shaped periphery. The double-furrow-opening shovel 10 is attached to a standard 12, secured to the rear end of a tension-brace 13, said tension-brace being preferably bifurcated with its front separated extremities pivotally connected to the front beam by means of clips 14. This provides for vertical movement of the rear end of the tension-brace, and hence a similar vertical movement of the furrow-opening shovel; and in order to secure the proper adjustment of the shovel I employ a hand-lever 15, connected by means of a pivotal link 16 to the rear end of the tension-brace and operating in connection with a toothed segment 17, to engage which it is provided with a locking-pawl 18. The peripherally V-shaped roller 11 is mounted in a yoke 19, provided with a central vertical spindle 20, which is mounted in a bearing 21 in the casting 22 which is secured to the rear beam, 2, of the frame. This roller follows the furrow-opening shovel and serves to compress the earth at the bottom and sides of the irrigating-furrow, whereby it is caused to preserve its shape and whereby washing is prevented.

Pivotally connected to the extensions of the front beam and outside of the terminal drill-shoes are the front extremities of the tension-braces 23, which correspond in construction and manner of mounting with the central brace above described, the arms or members of the said side tension-braces 23 being arranged, respectively, upon opposite sides of the ground-wheels. The side shovels 24, the standards 25 of which are carried by said braces 23, are arranged directly in rear of the ground-wheels 4, and said braces are connected by means of links 26 with the side hand-levers, 27, having pawls 28 to engage the toothed segments 29. Peripherally V-shaped packing-rollers 30, corresponding in construction with the central roller, 11, are arranged in rear of the shovels 24 and are mounted in yokes 31 having spindles 32 mounted in bearings 33 in the castings 34.

From the above description it will be seen that the shovels for opening the irrigating-furrows are arranged at the center of the series of drill-shoes and at the outer ends thereof and throw the earth laterally, and hence over the seed planted by the drills, and the packing-rollers follow said shovels in the furrows opened thereby and compress the earth to form permanent water-ways which serve to receive water deposited in the form of rain or supplied in any other way.

The rollers are swiveled upon the frame to provide for turning the machine at the ends of the rows with facility.

Various changes in the form, proportion, and the minor details of construction may be resorted to without departing from the spirit or sacrificing any of the advantages of this invention.

Having described my invention, I claim—

1. In a planter, the combination with a supporting-frame and planting mechanism including a plurality of series of drills, of furrow-opening shovels arranged between the contiguous ends and at the outer or remote ends of the series of drills to form irrigating-furrows parallel with the drills, and peripherally V-shaped rollers arranged respectively in rear of the furrow-opening shovels to follow the same in the furrows formed thereby and compress the soil at the bottom and sides of the furrows, whereby permanent irrigating-channels are formed parallel with and between the series of drills in which the seed is planted, substantially as specified.

2. The combination with planting mechanism, of furrow-opening shovels arranged between and independent of transverse series of drills to open irrigating-furrows, and rollers arranged in rear of said shovels to operate in the furrows opened thereby and compress the earth at the bottom and sides thereof, and swiveled yokes supporting said rollers and adapted to facilitate the turning of the machine, substantially as specified.

3. The combination with a supporting-frame, ground-wheels, and planting mechanism, of furrow-opening shovels arranged between series of drills, pivotal braces or drag-bars mounted at their front ends upon the frame and connected at their rear ends to the shovel-standards, hand-levers connected by links with the rear ends of said braces, means for locking the said levers to secure the shovels at the desired elevation, peripherally V-shaped packing-rollers arranged to follow the shovels and operate in the furrows opened thereby, yokes supporting said rollers and provided with central vertical spindles, and bearings carried by the frame for the reception of the spindles of the yokes, substantially as specified.

In testimony that I claim the foregoing as my own I have hereto affixed my signature in the presence of two witnesses.

COLLINS BLAKELY.

Witnesses:
JOHN F. WEBB,
L. WINGET.